United States Patent Office 2,998,560
Patented Aug. 29, 1961

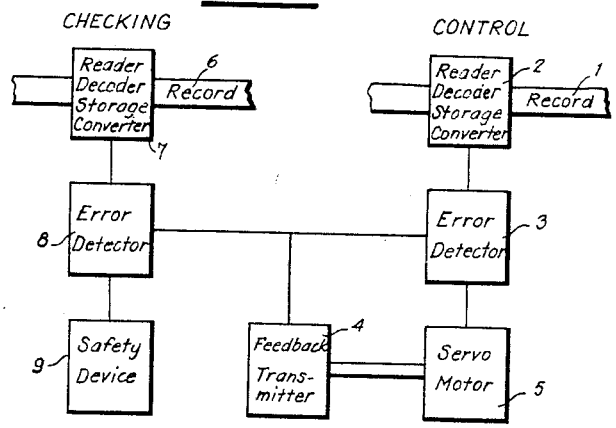
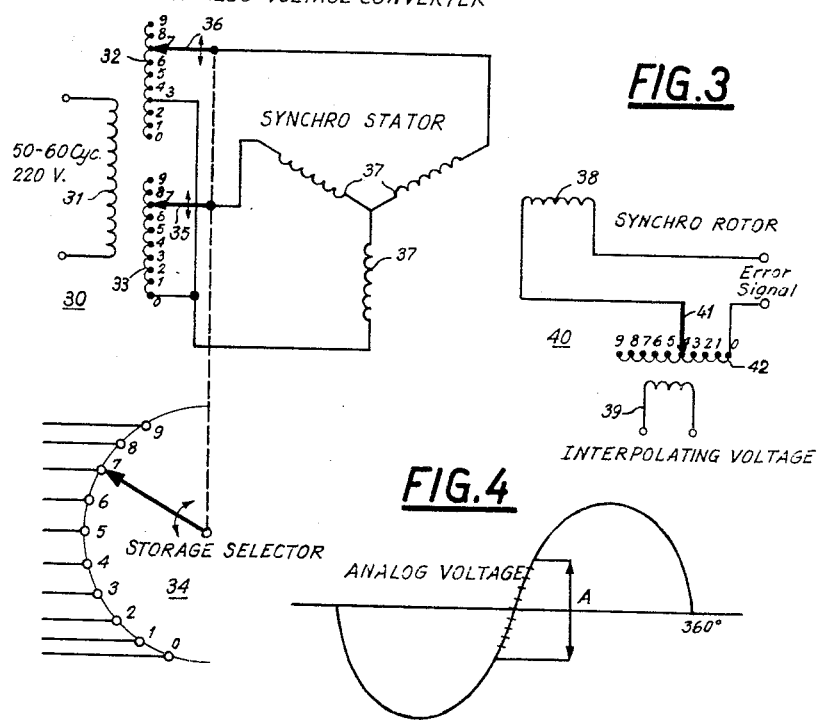

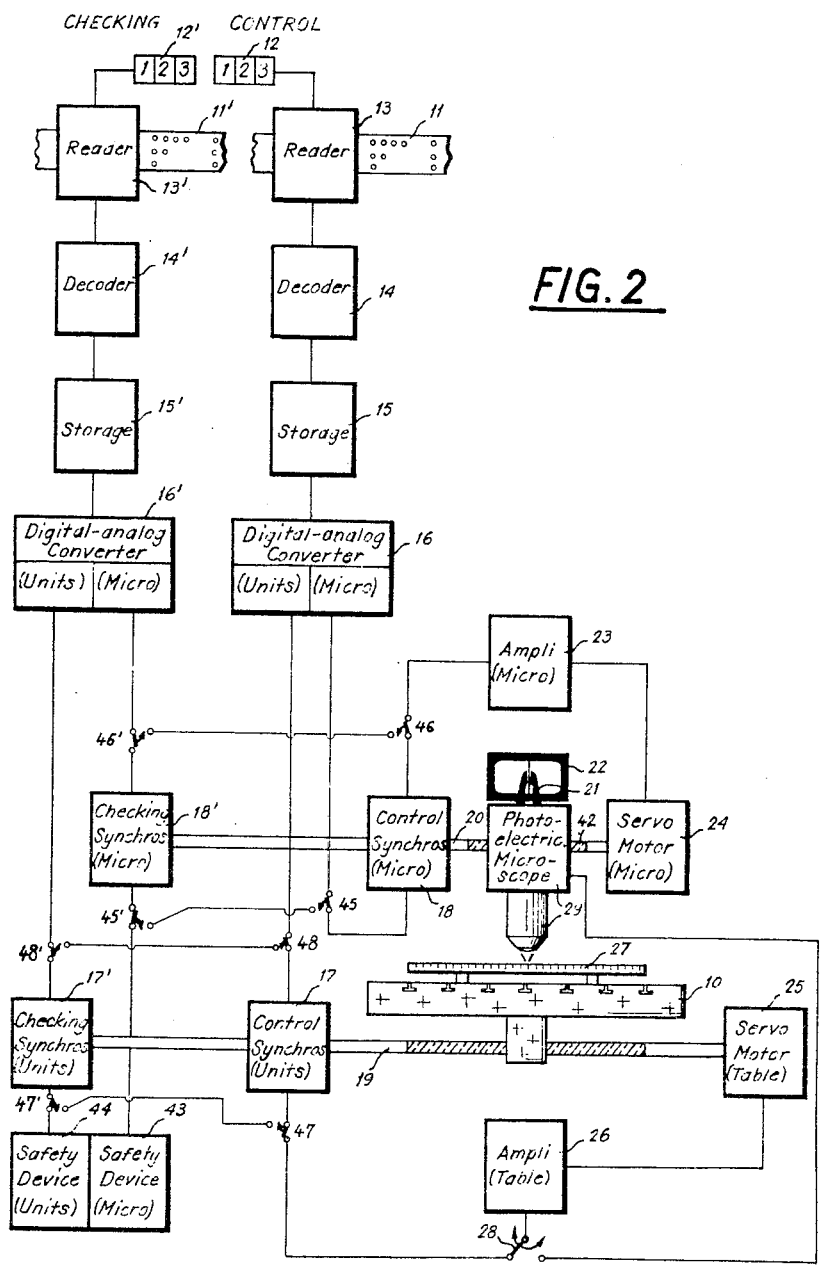

2,998,560
MACHINE-TOOL CONTROL SERVOSYSTEM
André Mottu, Geneva, Switzerland, assignor to Societe Genevoise d'Instruments de Physique, Geneva, Switzerland, a firm of Switzerland
Filed Feb. 24, 1960, Ser. No. 10,732
6 Claims. (Cl. 318—28)

This invention relates to a safety device for machine-tool control, and more particularly to a synchro control system of known type for co-ordinate drilling and milling machines.

Well known controls of this kind comprise generally means for deriving an instruction signal, for instance the signal corresponding to a desired setting of say 75.6403 in., from a record, a servo motor for effecting a relative displacement between two components of a machine-tool, for instance the work table and the cutter, means for deriving a feedback signal, analogous to the relative displacement, means for comparing the instruction and feedback signals to derive an error signal, the servo motor being responsive to the error signal to effect the relative displacement.

The feeding of settings data can be accomplished by a manually operated digit feed dial, a telephone dial, a punched-card or a punched-tape.

Especially in a control with punched-tape it may prove advantageous to have a possibility of checking its proper operation, particularly that recorded instructions are exactly followed.

In practice it has been found that in machine tools controlled by punched-tape, some 0.1% of the settings may be incorrect. This is because accurate sensing of the holes in the tape may be impeded by tears in the paper tape or small scraps of paper and dust in the holes. In the manufacture of articles for which a large number of settings are necessary, this error percentage of 0.1% is very important.

The invention aims at making erroneous settings impossible. It relates generally to machine-tools with any kind of data-input and operated according to the point-to-point positioning system, and more particularly to machine-tools, controlled by punched-tape records.

According to the invention, there are provided means for deriving a checking signal from second data-input means independent from the control data-input means, means for comparing this checking signal with the control feedback signal to derive a second error signal, and a safety device responsive to the second error signal.

In order that the invention may be clearly understood and readily carried into effect, it will be described with reference to the accompanying drawings, in which:

FIGURE 1 is a block diagram of one embodiment of the invention, where data-input is effected by punched-tape, FIGURE 2 is a diagram mainly in block form of a machine-tool control with a safety device according to the invention, the control device comprising well known synchros coupled separately to the work-table and the micrometer of the machine-tool, FIGURE 3 is a circuit diagram of the digital-analog converter and synchro employed in the device represented in FIGURE 2 and FIGURE 4 is a diagram of the error voltages appearing at the synchro rotor winding outputs.

It should at first be mentioned, that all the components shown in the block diagrams of the control and of the checking circuits are available commercially and are supplied by specialist firms. They are therefore not described in detail except for the digital-analog converter which differs a little from known converters. The principle and construction of the control circuit is known cf., "Numerically-Controlled Point-to-Point Positioning Systems," published by McGraw-Hill, January 1958. The invention is therefore concerned only with the checking circuit and the construction and coupling of this part with the control circuit.

Referring to FIGURE 1, numerical instructions recorded on a record in the form of punched-tape 1 are read, decoded, stored and converted into analog values at 2 before being fed to an error detector 3. The latter receives information about actual position of the controlled machine tool component from a feedback signal transmitter 4. Any difference between instruction and feedback signal causes an error signal which actuates the servo-motor 5 driving the machine component to reduce this difference to nil.

To be sure that instructions have been properly followed, the feedback signal is compared with a signal provided from the checking record tape 6, completely independent of the control tape 1. As in the control part the checking from tape 6 is fed to a reader-decoder-storage-converter unit 7. Any difference appearing in an error detector 8 between checking and feedback signal actuates a safety device 9, such as a warning light or a switch stopping the machine tool spindle motor (not shown).

FIGURE 2 represents in more detailed form a control and checking device for a machine tool component (e.g. a table) with a safety device according to the invention. In this device, the above mentioned synchros are applied.

Instructions for control of discrete positions of the machine-tool component 10 are recorded on a perforated tape 11 in binary code. Each block of instructions includes a row of holes for indicating operation number (e.g. 123) which appears on a readout 12, and one hole row for each coordinate digit, i.e. six, if coordinates up to 99 inches are given to the tenth decimal (.0001").

Only one machine tool component has been represented in this example for simplicity of description, but it is clear that several control devices can be used side by side for controlling more than one component. In case the same tape is used for all components, hole row indicating operation number is followed by a row indicating component to which coordinate digits are destined.

Instructions recorded on the tape 11 in binary digital form are read and translated into decimal form by a standard teletype reader 13 and decoder 14. Thereafter complete information about each coordinate is stored in a storage unit in the form of a standard telephone selector 15. These standard elements being well known and not part of the invention as such are not described in more detail. From now on, decimal digits are fed to a digital-analog converter 16 similar to that shown and described in "Numerically-Controlled Point-to-Point Positioning Systems," page 28, and illustrated in FIGURE 3. Voltage derived from the output studs of the converter 16 is fed to the stator windings of synchro transmitters.

At this point it may be reminded, that as already mentioned, the machine-tool is provided with separate synchros for the table and the micrometer, as already known in the art. But it is novel, to control a machine of this kind with punched-tape.

The synchros for the digits up to .1 in. are mechanically coupled together and connected with the drive of the work-table. Likewise the synchros for the digits up to .0001 in. are mechanically coupled together and connected with the fine setting system, i.e. an optical system, of the machine.

In the example shown in FIG. 2, voltage analogs corresponding to the three first digits (down to .1") are now directed to three table synchros 17 in succession, voltage analogs corresponding to the three last digits (403) being directed to three micrometer synchros 18 in succession. The rotors of these synchros are in a well known manner mechanically geared at 19 and 20 to the table 10 and micrometer slide lead screw 43 respectively, the gear ratio for each synchro corresponding to their respective digit. The micrometer slide carrying the photoelectric microscope 29 is linked with the split index 21 which is visible on the ground glass screen 22 of the machine frame. On work-table 10 there is mounted a precision standard scale 27 with .1 in. divisions. The .1 in. graduations of the scale can be seen by projection on to the screen 22, while index 21 can be moved over the screen so as to be centered on the division.

If with this type of machine-tool the work-table is moved by its drive according to the above value into the position 75.6 in., the graduation line 75.6 appears on the screen enlarged. The index must be on a position corresponding to .0403 in. If the micrometer motor is now energised to move the micrometer lead screw and the index so as to correspond with the position .0403, coincidence between precision scale division and index will bring the table in the accurate position corresponding to 75.6403 in. If a control signal corresponding to any disparity between units or fraction of in. of coordinate is transferred to the work-table drive, the latter is moved into the correct position in which the graduation 75.6 is exactly coincident with index.

This explanation is not to be taken to limit the invention to this particular apparatus or method of setting.

Turning now back to FIG. 2 and having in mind this explanation, if there is no coincidence between the micrometer slide first synchro rotor position (corresponding to the .01" range) and the position assigned by the stator voltage derived from the recorded instructions, an error voltage appears across the rotor winding (see also FIG. 3). This voltage is fed to the amplifier 23 and also FIG. 3). The voltage is fed to the amplifier 23 and after amplification fed to the micrometer slide servomotor 24 in order to reduce the deviation. The servo motor amplifier is then, as known and mentioned, switched over to the synchro corresponding to the next lower digit, (.001" range), when the error voltage supplied by the first synchro has dropped below a given value. When finally the error voltage is reduced to nil, the servo motor is not fed any more and the micrometer slide stops.

Similarly, the table servo-motor 25, being fed through the amplifier 26, controls the table drive, until the error voltage is reduced to a value corresponding to a difference between actual and assigned position less than half a division of a precision standard scale 27 (less than .05"). From now on, the table servo motor amplifier 26 is disconnected from the table synchros 17 at 28, and fed by the photo-electric microscope 29, carried by the micrometer slide and supplying an error voltage, as mentioned hereafter. Thus the working table 10 is brought into its exact position.

The photoelectric microscope 29 in FIGURE 2 is described in several U.S. patent applications, e.g. these having the following Serial Numbers 692,811, 692,848 and 805,625. This microscope scans the standard scale on which a line is traced every .1", and supplies an error voltage which is a function of the distance of the microscope axis from the scale reference line. At the same time, it is projecting the reference line on to the viewing screen 22. The index 21 carried by the slide allows a visual check of the intended coincidence between the microscope axis and the reference line, as mentioned before.

Turning to FIGURES 3 and 4 the digital-analog converter 16 of FIG. 2 comprises a transformer 30 supplied with electricity at mains voltage and frequency, having a primary winding 31 and two secondary windings 32 and 33, the latter ones tapped at 0, 1, 2 . . . 9 in accordance with the number of digits and provided with sliding contacts. Two wipers 35 and 36 coupled mechanically with the storage selector 34 of known type serve to link the secondary windings with the stator windings of the corresponding synchro. The basis of the circuit between the transformer 30, the synchro stator and the storage selector is known apart from the particular arrangement of tapping the transformer winding 32.

The rotor of the synchro with its main winding 38 has as known an interpolation winding inserted in the rotor circuit. The interpolation winding is used more particularly for the next smaller number coming after the 0.001" range.

By feeding an interpolation voltage to the rotor circuit of the synchro, a third micro-synchro can be dispensed with. According to the present case an interpolation voltage of magnitude A (FIGURE 6) in relation to the sinusoidal voltage analog of the next upper decimal is impressed on the primary winding 39 of the transformer 40. With the corresponding setting of the finger 41 on one of terminals corresponding to the possible numbers 0, 1, 2, 3 . . . 9 on the secondary winding 42 the magnitude of the desired interpolation voltage can be obtained. The control circuit heretofore comprises only five and not six synchros.

Turning now to the checking-section of the device according to the invention, in the left half of FIGURE 2 there is provided a checking tape 11' with a readout 12', a reader 13', a decoder 14', a storage unit 15' and a digital-analog converter 16' similar to the elements of the same kind provided for control. Converter outputs feed the stators of two checking synchro assemblies 17', 18', similar to the control synchros, the rotors of which are here mechanically linked to the rotors of the respective control synchros 17, 18.

Now, if there is any difference between the checking rotor position and the position assigned by the stator voltages, derived from the recorded checking instructions, for instance caused by an incorrect position of one of the control synchros due to a tape defect, an error voltage appears across the checking rotor winding outputs which actuates a switch or a contactor in the safety-devices 43, 44, lighting up a warning light or stopping the spindle driving motor of the machine-tool.

It is clear that checking of the correct position can be done properly only after the machine component has stopped, i.e. when control synchros 17, 18 are no more needed. The synchros may be therefore switched off control converter 16, and amplifiers 23, 26, see switches 45—48 and 45'—48' respectively, and switched to checking converter 16' and safety devices 43, 44 for checking, and the checking synchros 17', 18' dispensed with.

What I claim is:

1. In a machine-tool control system which includes means for deriving an instruction signal from data-input means, servo means for effecting relative displacement between two components of the machine-tool, a control synchro mechanically connected to said components thereby deriving a feedback signal in accordance with the relative positions of the said two components, means for comparing said instruction signal with said feedback signal and deriving an error signal therefrom and means for feeding said error signal to said servo means to effect said relative displacement, the improvement which comprises means for deriving a checking signal from a second record independently of the instruction signal record, at least one checking synchro mechanically connected to means for comparing said checking signal with said feedback signal to derive a second error signal, and a safety device response to said second error signal.

2. A machine-tool control system comprising means for deriving fine and coarse instruction signals from data-input means, first servo means for effecting relative displacement between two components of the machine-tool in response to said coarse instruction signal, means for deriving a feedback signal in accordance with the relative positions of the said two components, means for comparing said coarse instruction and feedback signal to derive a coarse error signal, means for feeding said coarse error signal to said servo means to effect said relative displacement, an optical setting system second servo means operatively connected to drive said optical setting system, means for deriving a second fine feedback signal in accordance with the position of said optical setting system, means for comparing said fine instructions signal to said second fine feedback signal to derive a fine error signal, means for feeding said second fine instruction signal to said second servo means, means for deriving coarse and fine checking signals from a second record independently of the control record, means for comparing said coarse and fine checking signal with checking feedback signal to derive second coarse and fine error signals and coarse and fine safety devices responsive to said second coarse and fine error signals respectively.

3. A control-system according to claim 2, wherein switching means operable connect first said means for deriving a coarse error signal and then said optical setting system to said first servo means.

4. In a machine-tool control system according to claim 2, the means for deriving the control and checking signals being punched-tape records.

5. A machine-tool control system, comprising means for deriving an instruction signal from a first record, servo means for effecting relative displacement between two components of the machine tool, at least one control synchro, means for mechanically connecting each said control synchro to said components to thereby derive a feedback signal in accordance with the relative position of the said two components, means for comparing said instruction signal and said feedback signal to derive an error signal, means for feeding said error signal said servo means to effect said relative displacement, means for deriving a checking signal from a second record independently of the instruction signal from said first record, means for comparing said checking signal with said feedback signal to derive a second error signal, switching means operable to connect each control synchro to said means for comparing said checking and feedback signals after the relative displacement has been effected by the servo means, and a safety device actuable by said second error signal.

6. A machine-tool control system, comprising means for deriving an instruction signal from a first record, servo means for effecting relative displacement between two components of the machine tool, at least one control synchro, means for mechanically connecting each said control synchro to said components to thereby derive a feedback signal in accordance with the relative position of the said two components, means for comparing said instruction signal and said feedback signal compared to derive an error signal, means for feeding said error signal to said servo means to effect said relative displacement, means for deriving a checking signal from a second record independently of the instruction signal from said first record, means for comparing said checking signal with said feedback signal to derive a second error signal, at least one checking synchro mechanically coupled to each said component and connected to said means for comparing the checking signal with the feedback signal, and a safety device actuatable by said second error signal.

References Cited in the file of this patent

UNITED STATES PATENTS

| | | |
|---|---|---|
| 2,560,337 | Fouassin | July 10, 1951 |
| 2,792,545 | Kamm | May 14, 1957 |